July 18, 1933. J. S. STEWART 1,919,080
OFFSET DISK HARROW
Filed Jan. 22, 1931 4 Sheets-Sheet 1

INVENTOR:
James S. Stewart,
BY

ATTORNEY.

July 18, 1933.  J. S. STEWART  1,919,080
OFFSET DISK HARROW
Filed Jan. 22, 1931   4 Sheets-Sheet 2
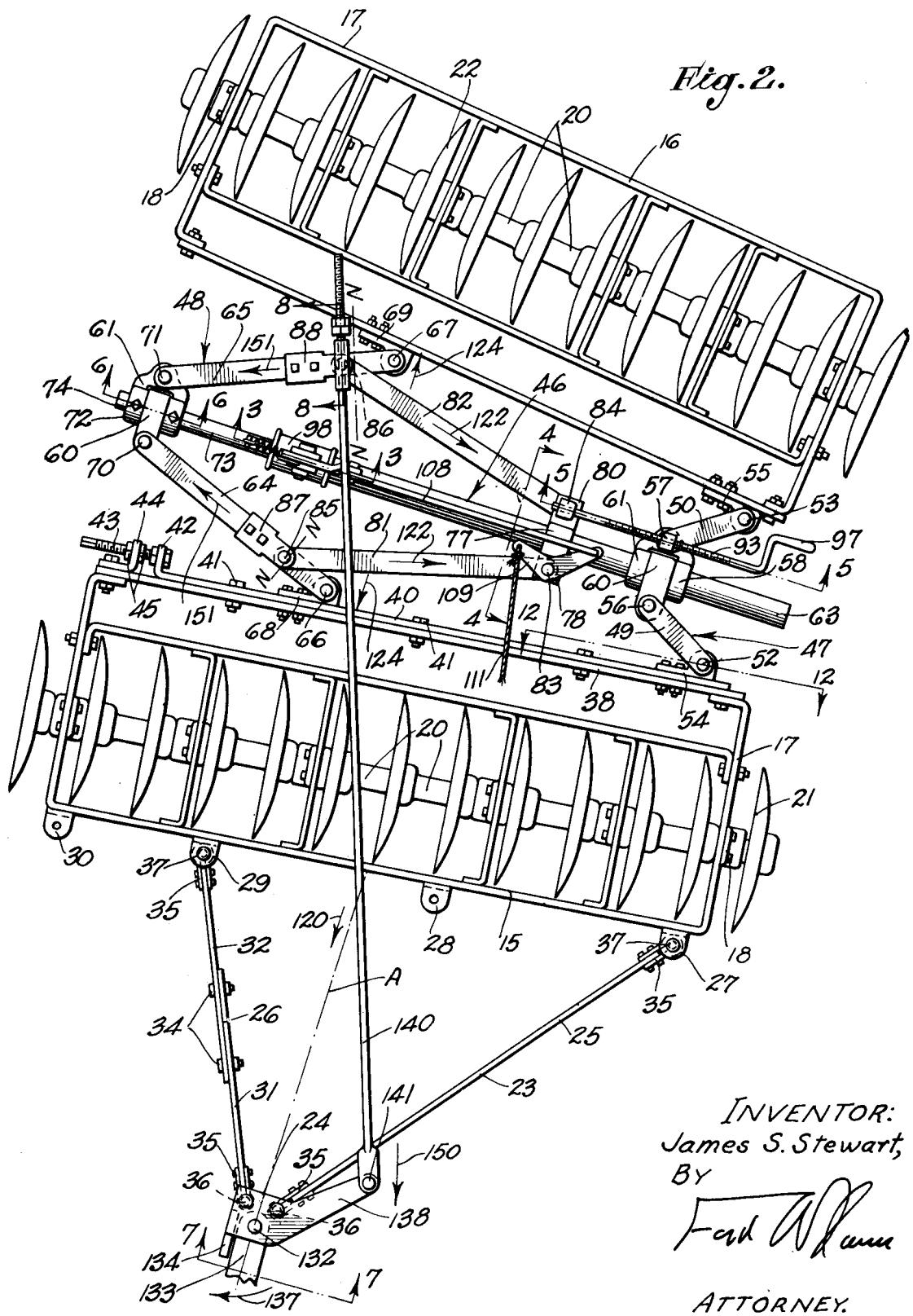
Fig.2.
INVENTOR:
James S. Stewart,
BY
ATTORNEY.

July 18, 1933. J. S. STEWART 1,919,080
OFFSET DISK HARROW
Filed Jan. 22, 1931 4 Sheets-Sheet 3
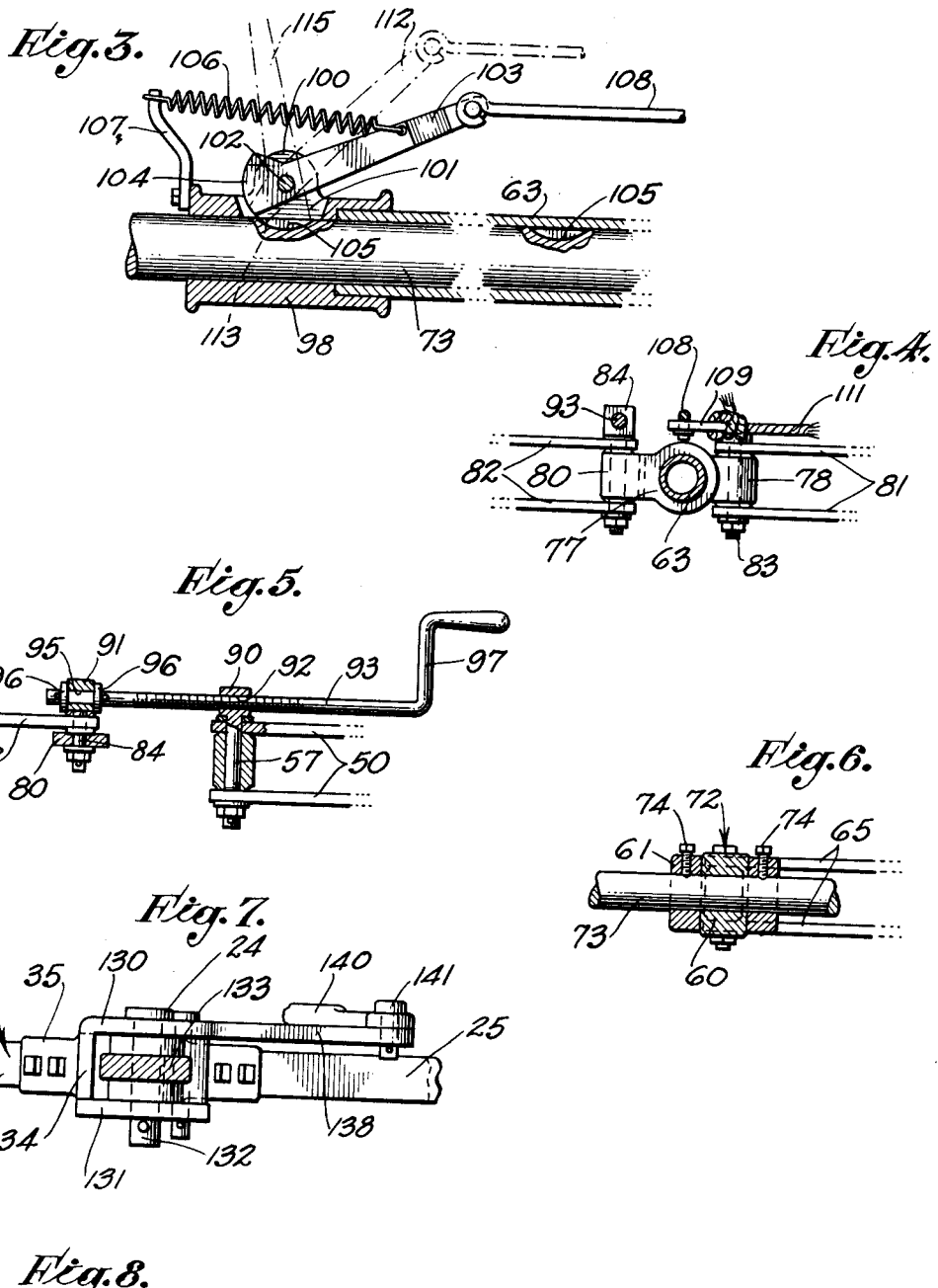
INVENTOR:
James S. Stewart,
BY
ATTORNEY.

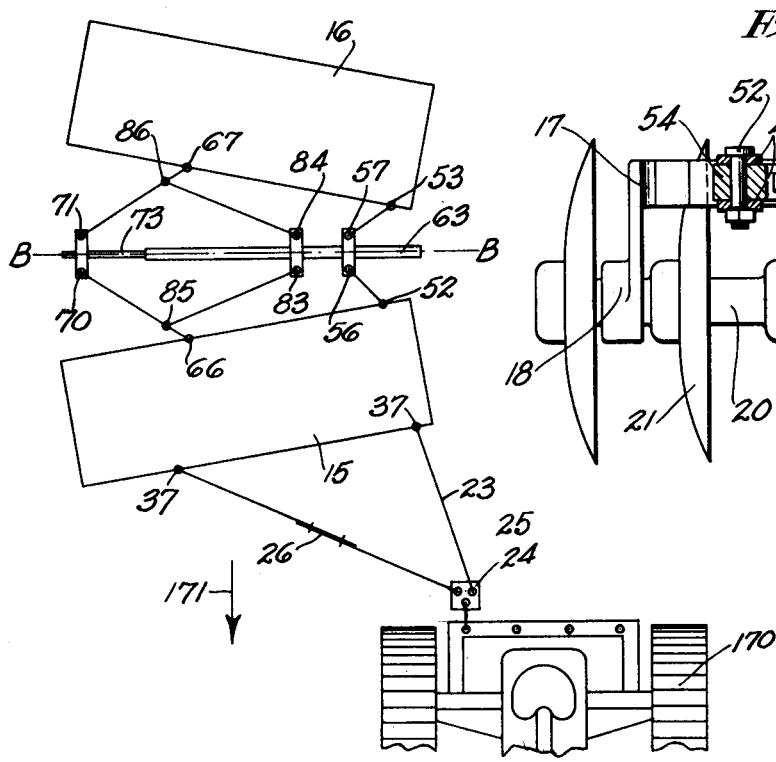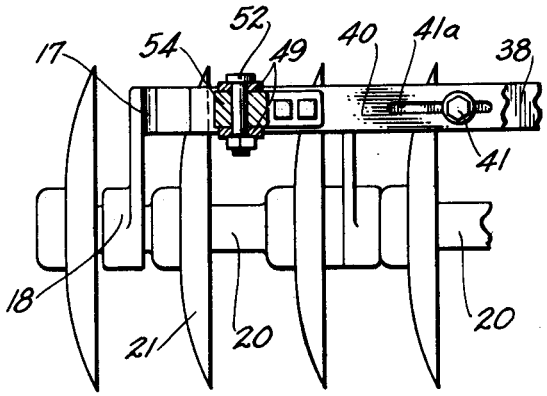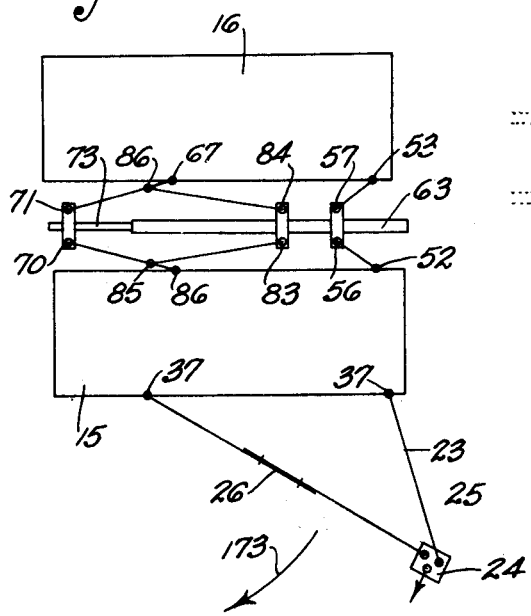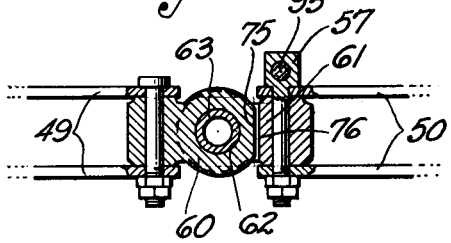

Patented July 18, 1933

1,919,080

UNITED STATES PATENT OFFICE

JAMES S. STEWART, OF OXNARD, CALIFORNIA, ASSIGNOR TO BRENNEIS MANUFACTURING COMPANY, OF OXNARD, CALIFORNIA, A CORPORATION OF CALIFORNIA

OFFSET DISK HARROW

Application filed January 22, 1931. Serial No. 510,410.

My invention relates to agricultural implements and relates particularly to a harrow or similar device having leading and following sections connected together in such a manner that the following section is drawn behind the leading section at a desired angle of operation. In this disclosure of a preferred embodiment of my invention I show the precepts of the invention applied to a simple form of disk harrow employing a leading section and a following section, each of which sections has a row of disks mounted on a horizontal and laterally extending axis so that these disks will travel over the ground with a rolling motion. In order to accomplish cultivation of the soil, it is necessary that these leading and following sections be disposed at angles to the direction of travel in order that the disks of one section will turn the soil in one direction and the disks in the other section will turn the soil in the opposite direction. In the use of these harrows it is often necessary to employ them in offset position behind the pulling vehicle or tractor in order to get under the branches of trees in an orchard. When this is done, it is found that the angles of operation of the two harrow sections will not as a general rule be equally divided on opposite sides of a line extending laterally perpendicular to the direction of movement of the harrow and will displace the surface soil.

It is an object of my invention to provide a harrow which, regardless of its position of operation, will preserve a substantially balanced angular relationship between the front and rear or leading and following sections of the harrow. By maintaining this proper relationship, it is possible to repeatedly harrow the soil without displacing it; whereas, if the angular relationship is not properly balanced, the surface of the soil will be displaced, making it necessary after repeated harrowings to re-level the soil.

It is a further object of my invention to provide a harrow having automatic means connecting the front and rear sections whereby a proper working angle between the leading and following sections will be established whenever the harrow is drawn in forward direction. In this new harrow no turning or backing is required to cause the harrow sections to assume their respective working angles.

It is a further object of the invention to provide in a harrow of the character above described a draft means for connecting the leading and following sections together, this draft means having primary links at one side of the harrow, secondary links at the other side of the harrow, and an automatic angle establishing means connecting the primary links with the secondary links in such a manner that the tension exerted in the primary links will produce a desired closing or opening movement of the secondary links whereby to automatically move the leading and following sections into their respective working angles whenever the harrow is pulled forwardly.

A further object of the invention is to provide in this automatic angle establishing means of the harrow a simple adjustment whereby the angles of the harrow sections may be set to suit the character of the soil being cultivated.

A further object of the invention is to provide a simple form of draft connection for securing the leading harrow to a draft vehicle, such as a tractor, this draft connection having a simple arrangement of parts whereby it flexibly attaches to the front draft links.

A further object of the invention is to provide in the harrow a simple form of turn starting mechanism which may be employed to initiate the collapsing movement of the harrow when a right turn is made in soft soil and where the disks penetrate the soil to such an extent that collapsing movement of the forward and leading sections is resisted.

A further object of the invention is to provide a harrow having a simple means of lateral adjustment whereby the position of operation of the following section may be offset relative to the leading section so that the disks of the following section will follow paths between the furrows or paths of the disks of the leading section.

Further objects and advantages of the invention will be made evident throughout the following part of the specification.

Referring to the drawings, which are for illustrative purposes only,

Fig. 2 is a plan view similar to Fig. 1 but showing the leading and following sections of the harrow disposed at a small working angle.

Fig. 3 is an enlarged fragmentary cross section on a plane represented by the line 3—3 of Fig. 2, showing the latch mechanism which may be employed to lock the leading and following sections in a desired angular working position.

Fig. 4 is an enlarged fragmentary cross section on a plane represented by the line 4—4 of Fig. 2.

Fig. 5 is a sectional view on a plane represented by the line 5—5 of Fig. 2, showing one of the adjustments for the automatic angle establishing means forming part of my invention.

Fig. 6 is an enlarged fragmentary section on a plane represented by the line 6—6 of Fig. 2.

Fig. 7 is an enlarged fragmentary section on a plane represented by the line 7—7 of Fig. 2.

Fig. 8 is an enlarged fragmentary section on a plane represented by the line 8—8 of Fig. 2.

Fig. 9 is a diagrammatic view showing the essential parts of my harrow in an offset working position behind a tractor.

Fig. 10 is a view similar to Fig. 9 showing the positions assumed by the leading and following sections during a rightward turn.

Fig. 11 is an enlarged cross section on a plane represented by the line 11—11 of Fig. 1.

Fig. 12 is an enlarged fragmentary section on a plane represented by the line 12—12 of Fig. 2.

Figure 1:
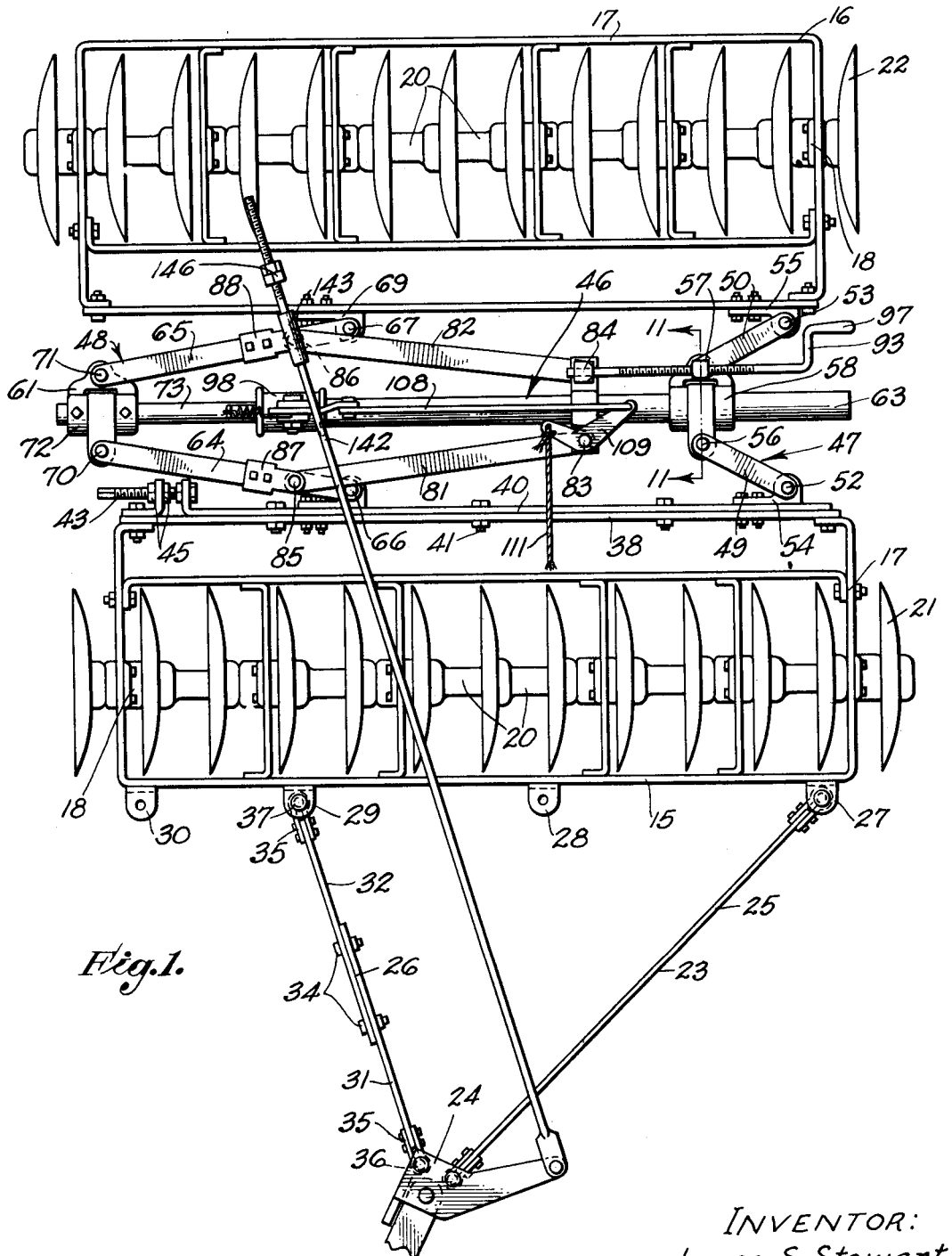
Fig. 1 is a plan view of a simple embodiment of my invention showing the harrow in collapsed position.

Referring particularly to Figs. 1 and 2, I employ in my new harrow a leading section 15 and a following section 16 each consisting of a rectangular metal frame 17 to which are secured bearing members 18 for supporting in horizontal and lateral positions shafts 20 on which harrow disks are secured. On the shafts 20 of the leading section 15, disks 21 are rotatably supported, and on the shafts 20 of the following section 16, disks 22 are rotatably supported. For the purpose of drawing the harrow behind a draft vehicle, such as a farm tractor, I employ a leading draft means 23 consisting of a draft connection 24 and links 25 and 26 which are secured to brackets 27, 28, 29, and 30 projecting forwardly from the frame 17 of the leading section 15. In Figs. 1 and 2 I show the links 25 and 26 connected to the brackets 27 and 29 so that the harrow will be in a position to follow directly behind the draft vehicle, but it is to be understood that for other working positions of the harrow other combinations of attachments of the links 25 and 26 to the brackets 27, 28, 29, and 30 may be employed. The link 26 is of extensible character and consists of front and rear bars 31 and 32 having holes punched therein to receive bolts 34 for holding them in overlapping relationship. The ends of the links are provided with U-shaped connectors 35 on the ends thereof to fit pins 36 and 37 by which the ends of the links 25 and 26 are secured to the draft connection 24 and the brackets 27 and 29.

Slidably secured to the rear bar 38 of the front frame 17 is a lateral adjustment bar 40 having longitudinal slots 41a through which bolts 41 extend. An end 42 is turned up on the bar 40, and an adjustment screw 43 is extended from this end 42 through a bracket 44 on the bar 38, there being lock nuts 45 for locking the screw in a set position. Connecting between the leading section 15 and the following section 16 is a following draft means 46 consisting of a primary draft connection 47 and a secondary draft connection 48. The primary draft connection 47 comprises pairs of primary links 49 and 50 which are pivotally secured by pins 52 and 53 to brackets 54 and 55 respectively mounted on the adjustment bar 40 and the rear frame 17. The adjacent ends of the links 49 and 50 are secured respectively by a pin 56 and a screw 57 to a swivel connector 58 comprising a centerblock 60 and a forked block 61 which are provided with bores 62 so as to fit around a tubular bar or pipe 63, as shown in Fig. 11. The secondary draft connection 48 consists of links 64 and 65 which are pivoted by pins 66 and 67 to brackets 68 and 69 mounted respectively on the lateral adjustment bar 40 and the front bar of the rear frame 17. The adjacent ends of the links 64 and 65 are secured by pins 70 and 71 to a flexible connector 72 similar to the connector 58 but being bored to fit a slide or extension bar 73 which extends into and slides within the leftward end of the tubular bar 63. The flexible connector 72 has a block 60 and a forked or divided body 61, and the divided body 61 is secured to the bar 73 by means of set screws 74. As shown in Fig. 11, the inner end of each body 60 is flat so as to provide a vertical face 75 resting adjacent a vertical face 76 of the forked body 61. These faces 75 and 76 are spaced apart at such distance that they will provide a limited relative vertical rotative movement between the parts 60 and 61, thus giving the connectors 58 and 72 a limited flexibility in a vertical plane.

On the tubular member 63 to the left of the flexible connector 58 is secured a block 77 having laterally extending walls 78 and 80 to which actuating links 81 and 82 are pivotally secured by means of a pin 83 and a screw 84. The leftward ends of the links 81 and 82 are pivoted at 85 and 86 to adjustable slide blocks 87 and 88 on the links 64 and 65. The slide blocks 87 and 88, being movable on the links 64 and 65, form means for adjustably pivoting the links 81 and 82 to the links 64 and 65 whereby to produce a desired actuation of the links 64 and 65. As shown in Fig. 5, the upper ends of the screws 57 and 84 are provided with heads 90 and 91 respectively, the head 90 having a horizontal threaded opening 92 through which may extend an adjusting screw 93 for moving the member 58 toward or away from the block 77. Thus it may be said that the block 77, the swivel connector 58, and the screw 93 form a means for adjustably securing the links 81 and 82 to the primary toggle links 49 and 50. The leftward end of the adjusting screw 93 extends through a smooth bore 95 in the head 91 of the screw 84, and collars or lock nuts 96 are mounted on the screw 93 adjacent the ends of the bore 95 so as to prevent relative movement between the head 91 and the screw. The screw 93 is provided with a handle 97 whereby it may be rotated so as to draw together or separate the screws 57 and 84 in a manner to cause the flexible connector 58 to slide along the tubular member 63. In the operation of the invention the adjustment between the parts and also the setting of the screw 93 are such that the links 49 and 50 reside at angles of substantially 45° to the axis of the tubular member 63.

On the leftward end of the tubular member 63 in a sleeve 98 having a pair of upwardly extending webs 100 on either side of a longitudinal opening 101. On a pin or shaft 102 which extends across the webs 100 is a latch bar 103. The inner end of the latch bar or lever 103 is provided with a circular segment 104 adapted to engage circular grooves 105 spaced at intervals along the bar 73 which projects through the sleeve 98. A tension spring 106 extending between the lever 103 and a bracket 107 tends to rotate the lever 103 in anti-clockwise or leftward direction. A link 108 extends to a bell crank 109 which is hinged on the upper end of the pin 83 and is adapted to be rotated by means of a rope 111 which is carried forwardly to the tractor so that it may be pulled by the operator when he desires to release the latch which prevents sliding movement of the bar 73 relative to the tubular member 63. In the position in which the lever 103 is shown in full lines, the segment 104 is shown entirely disengaged from the bar 73. In the dotted line position indicated at 112, the segment 104 is shown in partial engagement with a notch 105. When the lever 103 is in this position, the bar 73 may move outwardly through the sleeve 98 but may not move inwardly owing to the fact that the lower corner 113 of the segment 104 serves as a ratchet which will engage a notch 105 and prevent rightward movement of the bar 73 but will ride out of the slot 105 when the bar 73 is moved in leftward direction. When the lever 103 is in the position indicated by dotted lines 115, the segment 104 is in full engagement with the groove or depression 105 and locks the bar 73 against movement in either direction relative to the tubular member 63.

The locking device just described need not be employed in the general use on level ground of the harrow which is capable of automatic adjustment to the angular operating position for which it is set, but it is often found that the locking device has real utility when the harrow is being used on hilly ground where the harrow tends to roll down the slope and thus cause the leading and following sections to assume parallel or closed positions. Also, where it is desired to maintain the leading and following sections in parallel or closed position so that the harrow will roll freely over the ground in being transferred from one point of operation to another, the latch may be employed to prevent swinging of the leading and following sections into working position.

In Fig. 1 I show the harrow in closed position, that is, with the leading section 15 and the following section 16 parallel. This is the position of these parts during a turn of the harrow to the right or before the start of a forward movement of the harrow. In Fig. 2 the harrow is shown moving along a line of travel A in the direction of an arrow 120. The pulling force transmitted from the pin 52 to the primary draft connection 47 produces a tension in the links 49 and 50, which tension tends to straighten the toggle formed by the links 49 and 50 and move the member 57 in rightward direction. The screw 93 is so adjusted and the slide blocks 87 and 88 are so placed on the links 64 and 65 that the tension exterted through the primary toggle links 49 and 50 in pulling the rightward end of the following section 16 along behind the leading section 15 produces a tension in the links 81 and 82 as indicated by arrows 122 in Fig. 2. This tension is exerted on the pins 85 and 86 and causes the secondary toggle links 64 and 65 to swing from the positions in which they are shown in Fig. 1 to the positions in which they are shown in Fig. 2, the bar 73 sliding further into the leftward end of the tubular member 63 and the opening of the toggle formed by the links 64 and 65 causing a definite spreading force to be exerted between the leading and following sections 15 and 16 as indicated by arrows 124, with the result that the rightward ends of the leading and following sections 15 and 16 are separated and the leading and following sections 15 and 16 are swung into angular positions relative to the axis of the tubular member 63, which tubular member, it will be noted, extends perpendicular to the line of travel A.

The toggle link construction of the following draft means 46 is such that the leading and following sections 15 and 16 automatically swing into substantially equal angles relative to the line of movement A regardless of whether the harrow is employed in a trailing position such as shown in Fig. 2 or in an offset position such as shown in Fig. 9.

Often, when the harrow is used on very soft soil, the disks will penetrate deeply thereinto so that the starting of a leftward turn is resisted. My invention employs a simple means for initiating the closing movement of the following section relative to the leading section so that the turn may be made with ease. As shown in Figs. 1, 2, and 7, the draft connection 24 consists of an upper plate 130 and a lower plate 131. A pin 132 extends through the forward ends of these plates for the purpose of attachment to a draft bar 133 of a tractor. At the rearward end of the plates, openings are provided for the vertical pins 36 which project through the ends of the U-shaped connectors 35 on the forward ends of the links 25 and 26. To the left of the pin 132 and the draft bar 133, a vertical wall 134 extends from the upper plate 130 to the lower plate 131. The wall 134 prevents rotation of the draft bar 133 relative to the connector 24 in the direction indicated by an arrow 137 in Fig. 2. Therefore, when the tractor is turned to the right relative to the forward direction of movement indicated by the line A and the arrow 120, the draft connection 24 will be rotated into a position such as that in which it is shown in Fig. 1. Extending diagonally rearwardly from the upper plate 130 is an arm 138 to which a pull bar 140 is secured by means of a pin or bolt 141. The rearward end 142 of the bar 140 extends, as shown in Figs. 1, 2, and 8, through a sleeve 143 mounted on the pivot means 86 by which the link 82 is secured to the slide block 88. The pivot means 86 consists of a screw stud which extends upwardly from the leftward end of the link 82 through an opening 144 in the slide block 88. Welded to the sleeve 143 is an internally threaded member 145 which screws down on the upper end of the stud 86. Stop means in the form of lock nuts 146 are provided on the threads 147 at the extremity of the rearward end 142 of the bar 140. In Fig. 1, the lock nuts 146 are shown in their normal position during the forward or straight-ahead operation of the harrow. When a rightward turn of the harrow is to be made, or in other words, in the direction indicated by the arrow 137 of Fig. 2, the initial turning movement of the tractor causes the draft connection 24 to rotate and thereby causes the lever arm 138 to swing in the direction indicated by the arrow 150 of Fig. 2, thereby pulling forwardly on the secondary link 65 and initiating the collapsing movement of the following section 16 so that the harrow will readily collapse and will readily turn to the right. When the right turn has been completed and the direction of travel of the tractor again brought into a straight line, the harrow parts will immediately assume the operating positions in which they are shown in Fig. 2.

In Figs. 1 and 2 I show the blocks 87 and 88 set for a slight opening action. In other words, when the harrow is pulled forwardly, the forces acting in the links 49, 50, 81, 82, 64, and 65 swing the leading and following sections 15 and 16 into angular position with but small expansive force. By moving the blocks 87 and 88 in directions opposite to the arrows 151 so that the points of pivot will be brought into coincidence with the planes indicated by the line N—N, the forces in the following draft connection 46 will be substantially neutralized so that there will be neither opening nor closing action exerted on the links 64 and 65. By moving the points of pivot 85 and 86 beyond the neutral planes N—N in a direction opposite to that indicated by the arrows 151, the forces exerted in the links 64 and 65 will be collapsing instead of expansive, or, in other words, will be opposite to the directions indicated by the arrows 124 and will tend to close the harrow. This adjustment is employed when the harrow is used in extremely soft soil which permits the disks 21 and 22 to sink deeply thereinto.

In Fig. 9 I show the harrow operating in offset position relative to a tractor 170. The direction of movement of the tractor and also the harrow is indicated by an arrow 171. With the link construction employed in the following draft means 46, the leading and following sections 15 and 16 assume equal angles on either side of a line B—B extended perpendicular to the line of movement indicated by the arrow 171. In other words, the distribution of forces in this harrow is such that the intermediate bar 63 assumes a position very close to perpendicular to the line of travel whenever the harrow is being pulled forwardly, which is a condition of great value in harrows which are to be used in trailing and in offset positions. When the offset harrow is turned to the right or in the direction indicated by the arrow 173 in Fig. 10, the leading and following sections 15 and 16 move into collapsed relationship, as shown, this collapsing action being accomplished regardless of whether the harrow is being drawn forwardly in trailing or in offset position. Upon again assuming a forward line of travel, the leading and following sections 15 and 16 immediately assume working position such as shown in Fig. 9.

I claim as my invention:

1. An implement of the character described, including: a leading section and a following section; means for pulling said leading section; and following draft means connecting said following section to said leading section, said following draft means comprising primary toggle links extending from one side of said leading section to the corresponding side of said following section, secondary toggle links connecting the remaining side of said leading section with the remaining side of said following section, and actuating means extending from said primary toggle links to said secondary links whereby tension exerted in said primary toggle links will move said secondary toggle links.

2. An implement of the character described, including: a leading section and a following section; means for pulling said leading section; following draft means connecting said following section to said leading section, said following draft means comprising primary toggle links extending from one side of said leading section to the corresponding side of said following section, secondary toggle links connecting the remaining side of said leading section with the remaining side of said following section, and actuating means extending from said primary toggle links to said secondary links whereby tension exerted in said primary toggle links will move said secondary toggle links; and a latch operative to prevent movement of said secondary toggle links.

3. An implement of the character described, including: a leading section and a following section; leading draft means secured to said leading section; a laterally extending bar between said leading and following sections having a primary connector mounted near one end thereof; primary toggle links connecting between said primary connector and said leading and following sections; a secondary connector mounted in movable relationship relative to the opposite end of said bar; secondary toggle links extending between said secondary connector and said leading and following sections; pivots on said secondary toggle links; actuating links having hinged connection with said pivots; and means for connecting said actuating links to said primary toggle links.

4. An implement of the character described, including: a leading section and a following section; leading draft means secured to said leading section; a laterally extending bar between said leading and following sections having a primary connector mounted near one end thereof; primary toggle links connecting between said primary connector and said leading and following sections; a secondary connector mounted in movable relationship relative to the opposite end of said bar; secondary toggle links extending between said secondary connector and said leading and following sections; pivots adjustably secured to said secondary toggle links; actuating links having hinged connection with said pivots; and means for connecting said actuating links to said primary toggle links.

5. An implement of the character described, including: a leading section and a following section; leading draft means secured to said leading section; a laterally extending bar between said leading and following sections having a primary connector mounted near one end thereof; primary toggle links connecting between said primary connector and said leading and following sections; a secondary connector mounted in movable relationship relative to the opposite end of said bar; secondary toggle links extending between said secondary connector and said leading and following sections; pivots on said secondary toggle links; actuating links having hinged connection with said pivots; and means for adjustably connecting said actuating links to said primary toggle links.

6. An implement of the character described, including, a leading section and a following section; leading draft means secured to said leading section; a laterally extending bar between said leading and following sections having a primary connector mounted near one end thereof; primary toggle links connecting between said primary connector and said leading and following sections; a secondary connector mounted in movable relationship relative to the opposite end of said bar; secondary toggle links extending between said secondary connector and said leading and following sections; pivots adjustably secured to said secondary toggle links; actuating links having hinged connection with said pivots; and means for adjustably connecting said actuating links to said primary toggle links.

7. An implement of the character described, including: a leading section and a following section; leading draft means secured to said leading section; a laterally extending bar between said leading and following sections having a primary connector mounted near one end thereof; primary toggle links connecting between said primary connector and said leading and following sections; a secondary connector mounted in movable relationship relative to the opposite end of said bar; secondary toggle links extending between said secondary connector and said leading and following sections; pivots on said secondary toggle links; a block mounted on said bar; actuating links extending between said pivots and said block; and a screw for producing relative movement of said block and said primary connector.

8. An implement of the character described, including: a leading section and a following section; leading draft means secured to said leading section; a laterally extending bar between said leading and following sections having a primary connector mounted near one end thereof; primary toggle links connecting between said primary connector and said leading and following sections; a secondary connector mounted in movable relationship relative to the opposite end of said bar; secondary toggle links extending between said secondary connector and said leading and following sections; pivots adjustably secured to said secondary toggle links; a block mounted on said bar; actuating links extending between said pivots and said block; and a screw for producing relative movement of said block and said primary connector.

9. An implement of the character described, including: a leading section and a following section; leading draft means secured to said leading section; a laterally extending bar between said leading and following sections having a primary connector mounted near one end thereof; primary toggle links connecting between said primary connector and said leading and following sections; a secondary connector mounted in movable relationship relative to the opposite end of said bar; secondary toggle links extending between said secondary connector and said leading and following sections; pivots on said secondary toggle links; actuating links having hinged connection with said pivots; means for connecting said actuating links to said primary toggle links; a lever arm on said leading draft means adapted to swing forwardly when a negative turning force is exerted on said leading draft means; and a tension member extending from said lever arm to said secondary toggle links for initiating collapsation of said toggle links when said leading draft means is turned in negative direction.

10. A draft connection for securing an implement to a pulling vehicle, including: a pair of bars having means at their rearward ends for attachment to the implement; a plate member comprising a lower horizontal plate and an upper horizontal plate spaced therefrom; a draft pin extending vertically through the forward ends of said plates; and pivot pins extending in side by side relationship between the rearward ends of said plates for securing the forward ends of said bars to said plate member in horizontally swingable relationship.

11. A harrow of the character described having a leading section and a following section, and a following draft means for connecting said following section to said leading section, comprising: a primary connecting means connecting one side of said leading section to a like side of said following section, said primary connecting means having a part which moves in response to forward movement of said leading section relative to said following section; a secondary connecting means connecting the opposite side of said leading section to the adjacent side of said following section, said secondary connecting means having movable parts operative to spread apart said opposite side of said leading section and said adjacent side of said following section; means connecting said movable part of said primary connecting means with said movable parts of said secondary connecting means so as to cause a spreading movement of said movable parts of said secondary connecting means in response to movement of said movable part of said primary connecting means; and releasable means for holding said sections in parallel relation.

12. A harrow of the character described having a leading section and a following section, and a following draft means for connecting said following section to said leading section, comprising: a primary connecting means connecting one side of said leading section to a like side of said following section, said primary connecting means having a part which moves in response to forward movement of said leading section relative to said following section; a secondary connecting means connecting the opposite side of said leading section to the adjacent side of said following section, said secondary connecting means having movable parts operative to spread apart said opposite side of said leading section and said adjacent side of said following section; means connecting said movable part of said primary connecting means with said movable parts of said secondary connecting means so as to cause a spreading movement of said movable parts of said secondary connecting means in response to the movement of said movable part of said primary connecting means; releasable means for holding said sections in parallel relation; and means for limiting the spreading movement of said following section relative to said leading section.

13. A harrow of the character described having a leading section and a following section, and a following draft means for connecting said following section to said leading section, comprising: a primary connecting means connecting one side of said leading section to a like side of said following section, said primary connecting means having a part which moves in response to forward movement of said leading section relative to said following section; a secondary connecting means connecting the opposite side of said leading section to the adjacent side of said following section, said secondary connecting means comprising a pair of toggle links connected so as to spread apart said opposite side of said leading section and said adjacent side of said following section; means connecting said movable part of said primary connecting means with said toggle links of said secondary connecting means so as to cause a spreading movement of said toggle links of said secondary connecting means in response to movement of said movable part of said primary connecting means; and releasable means for holding said sections in parallel relation.

14. A harrow of the character described having a leading section and a following section, and a following draft means for connecting said following section to said leading section, comprising: a primary connecting means connecting one side of said leading section to a like side of said following section, said primary connecting means having a part which moves in response to forward movement of said leading section relative to said following section; a secondary connecting means connecting the opposite side of said leading section to the adjacent side of said following section, said secondary connecting means having movable parts operative to spread apart said opposite side of said leading section and said adjacent side of said following section; means connecting said movable part of said primary connecting means with said movable parts of said secondary connecting means so as to cause a spreading movement of said movable parts of said secondary connecting means in response to movement of said movable part of said primary connecting means; and means for controlling the spreading of said sections by said following draft means.

15. A harrow of the character described having a leading section and a following section, and a following draft means for connecting said following section to said leading section, comprising: a primary connecting means connecting one side of said leading section to a like side of said following section, said primary connecting means having a part which moves in response to forward movement of said leading section relative to said following section; a secondary connecting means connecting the opposite side of said leading section to the adjacent side of said following section, said secondary connecting means comprising a pair of toggle links connected so as to spread apart said opposite side of said leading section and said adjacent side of said following section; means connecting said movable part of said primary connecting means with said toggle links of said secondary connecting means so as to cause a spreading movement of said toggle links of said secondary connecting means in response to movement of said movable part of said primary connecting means; and means for controlling the spreading of said sections by said toggle links.

JAMES S. STEWART.